United States Patent
Charon

(10) Patent No.: US 9,172,230 B2
(45) Date of Patent: Oct. 27, 2015

(54) CABLE RACEWAY SUPPORT DEVICE FOR AN AIRCRAFT, IN PARTICULAR AN AIRCRAFT WITH A STRUCTURE AT LEAST PARTLY FORMED FROM A COMPOSITE MATERIAL

(71) Applicant: Airbus Operations (SAS), Toulouse (FR)

(72) Inventor: Pierre Charon, Toulouse (FR)

(73) Assignee: Airbus Operations (S.A.S.), Toulouse (FR)

(*) Notice: Subject to any disclaimer, the term of this patent is extended or adjusted under 35 U.S.C. 154(b) by 50 days.

(21) Appl. No.: 13/624,176

(22) Filed: Sep. 21, 2012

(65) Prior Publication Data
US 2013/0068898 A1    Mar. 21, 2013

(51) Int. Cl.
*H02G 3/22* (2006.01)
*H02G 3/30* (2006.01)
*H02G 3/00* (2006.01)
*F16L 3/06* (2006.01)

(52) U.S. Cl.
CPC .............. *H02G 3/30* (2013.01); *H02G 3/263* (2013.01); *F16L 3/06* (2013.01); *H02G 3/22* (2013.01)

(58) Field of Classification Search
USPC ................. 248/316.1, 317, 226.11, 231.71; 174/71 R, 72 R, 70 R, 68.1; 439/121, 439/110, 111, 114, 117, 119, 532, 530
See application file for complete search history.

(56) References Cited

U.S. PATENT DOCUMENTS

| | | | | |
|---|---|---|---|---|
| 4,190,309 A | * | 2/1980 | Glass | 439/118 |
| 4,289,365 A | * | 9/1981 | Rutgers | 439/116 |
| 4,919,625 A | * | 4/1990 | Coutre | 439/118 |
| 6,059,582 A | * | 5/2000 | Tsai | 439/121 |
| 7,455,535 B2 | * | 11/2008 | Insalaco et al. | 439/121 |
| 7,692,104 B2 | | 4/2010 | Charon et al. | |
| 2009/0032975 A1 | * | 2/2009 | Do et al. | 257/784 |

FOREIGN PATENT DOCUMENTS

| | | | |
|---|---|---|---|
| DE | 102012005481 A1 * | 9/2013 | F21S 8/00 |
| EP | 0184931 | 6/1986 | |
| EP | 2218641 | 8/2010 | |
| FR | 2905038 | 2/2008 | |
| GB | 685964 | 1/1953 | |

OTHER PUBLICATIONS

French Search Report for Application No. FR 1158383 dated Jun. 5, 2012.

* cited by examiner

*Primary Examiner* — Alfred J Wujciak
(74) *Attorney, Agent, or Firm* — Jenkins, Wilson, Taylor & Hunt, P.A.

(57) ABSTRACT

A cable raceway support device for an aircraft, formed from an electrically conductive material, comprising a pedestal having a fastening plane for the fastening of the device onto a primary structure and also having, on a support face which is an opposite face to the fastening plane, at least one pair of jaws having at least one electrical contact enabling a sliding electrical contact to be formed and the support face has a contact that projects, and also has a jaw overhanging the support face, the jaw forming with part of the pedestal the pair of jaws forming a stirrup-shaped clamp comprising a base and two branches, one branch of the clamp merging with the pedestal, and the other branch of the clamp corresponding to the jaw and bearing a second contact facing the first contact.

7 Claims, 1 Drawing Sheet

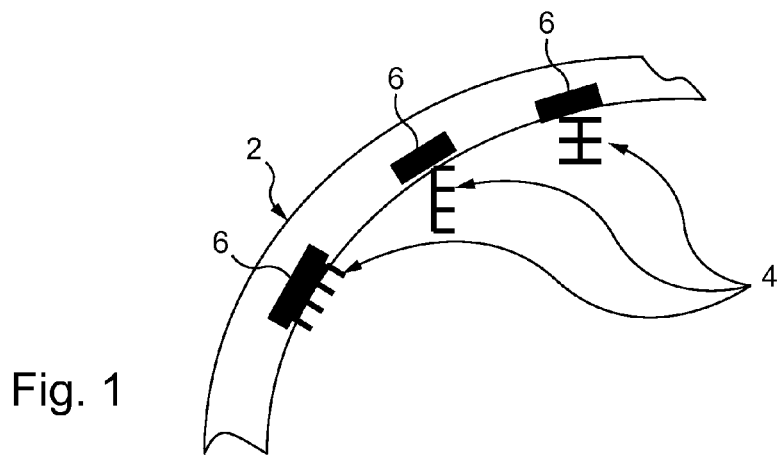
Fig. 1
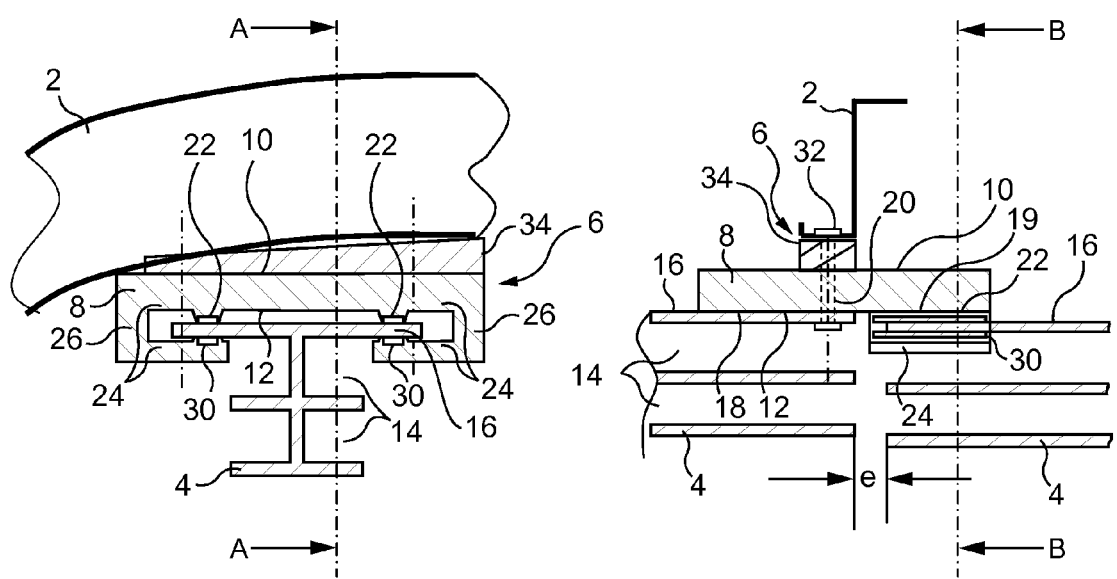
Fig. 2
Fig. 3
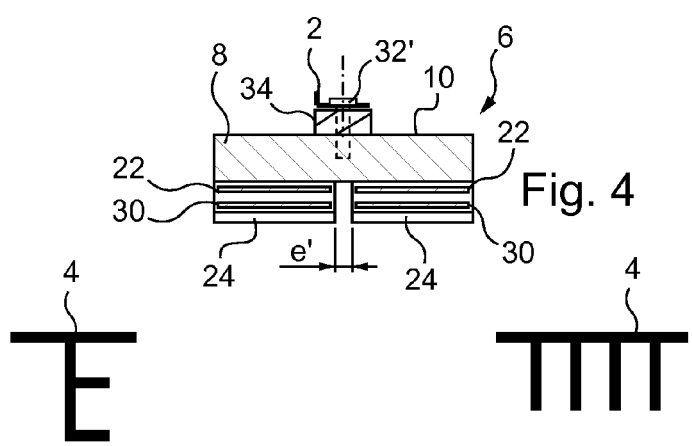
Fig. 4
Fig. 5
Fig. 6

CABLE RACEWAY SUPPORT DEVICE FOR AN AIRCRAFT, IN PARTICULAR AN AIRCRAFT WITH A STRUCTURE AT LEAST PARTLY FORMED FROM A COMPOSITE MATERIAL

CROSS-REFERENCE TO RELATED APPLICATION

This application claims the benefit of and priority to French Application No. 1158383, filed Sep. 21, 2011, the entire disclosure of which is herein incorporated by reference.

TECHNICAL FIELD

The present invention concerns a cable raceway support device for an aircraft.

BACKGROUND

In an aircraft, it is known to use a cable raceway comprising a structure within which come to be housed the supported cables and further comprising a cover closing and retaining all the cables housed in the structure.

The structure is for example a structure of profiled cross-section comprising a planar base on one side of which extend longitudinal walls perpendicular to the base and parallel to each other. Together with the base, two neighboring longitudinal walls thus form a channel configured to serve as a housing for cables.

The known cable raceway structures are generally of metal. Such a cable raceway provides various functions. First of all it supports and mechanically protects cables and/or cable harnesses. Thanks to the presence of several channels, it also provides physical segregation of various cables. The cable raceway also provides thermal drainage by conduction and protection of the cables against electromagnetic interference to which they may be subjected. This last function in particular makes it possible to avoid additional shielding for the cables.

Most aircraft comprise a metallic structure which provides the return for the current transported by cables housed in the cable raceways. The aircraft of modern design increasingly use structural parts of composite material Return of the current is then no longer provided by the structure. A return for current should therefore be provided. Such a return is then provided by a distinct electrical link produced using wires or a bar of aluminum to provide for the return of the transported current. The drawback of this solution is that it increases the on-board mass of the aircraft.

Patent application FR-2 905 037 provides a cable raceway that makes it possible to keep the advantages of the cable raceways of the prior art without penalizing the mass of the aircraft. The cable raceway provided in that prior art document comprises a metallic structure of profiled cross-section having one or more housings for receiving cables. A layer of insulating material then covers the face of the cable raceway that is configured to bear on a carrying wall of the aircraft. The cable raceway described in that prior patent application is then used to provide the return of the current transported in the cables.

SUMMARY

The present invention more particularly concerns such cable raceways having a metallic structure adapted to receive cables and which must provide a return for current, in particular in an aircraft whose structure is entirely or at least partly formed from composite materials.

The problem at the origin of the present invention is to provide electrical continuity between two successive sections of cable raceway and also to minimize the contact resistances between the cable raceway and the primary structure of the aircraft onto which the cable raceway is fastened.

To that end, the present invention provides a cable raceway support device for an aircraft, in particular intended for an aircraft with a structure at least partly formed from a composite material.

According to the present invention, this support device is formed from an electrically conductive material, and comprises a pedestal having a fastening plane for the fastening of the device onto a primary structure, and further comprises, on a support face which is an opposite face to the fastening plane, at least one pair of jaws having at least one electrical contact enabling a sliding electrical contact to be formed.

The support face advantageously has a first contact that projects, that is to say of form protruding relative to the support face, and also has a jaw overhanging the support face, the jaw forming with part of the pedestal the pair of jaws forming a stirrup-shaped clamp comprising a base and two branches, one branch of the clamp merging with the pedestal, and the other branch of the clamp corresponding to the jaw and bearing a second contact facing the first contact.

With such a support device, the pair of jaws makes it possible to hold an end of a section of cable raceway while enabling that section to expand freely. The sliding electric contact for its part makes it always possible to provide a good contact between the cable raceway and the support device, which is preferably integrally formed from an electrically conductive material.

For good mechanical strength of an end of a section of cable raceway, while maintaining control over the clamping applied to that end, the jaws of a pair of jaws are advantageously elastically linked together so as to form a clamp. This clamp is for example stirrup-shaped with two branches, one of the branches being integrated into the pedestal of the support device.

In a support device according to the present invention, each jaw preferably bears an electrical contact zone which preferably protrudes, and the electrical contact zones of the same pair of jaws face each other. Such a device may then adapt to a high number of cable raceway types.

The electrical contact zones of a cable raceway support device according to the invention are for example formed from a conductive material chosen from the group comprising nickel, silver and the alloys comprising a high proportion of those metals. These metals enable good sliding electrical contact to be made.

In a first embodiment of a cable raceway support device according to the invention, the support face which is an opposite face to the fastening plane has a first planar zone adapted to receive a first section of cable raceway and comprising at least two bores and a second planar zone provided with at least one pair, and preferably two pairs, of jaws adapted to receive a second section of cable raceway. A cable raceway section end may then be fastened on the support device and another cable raceway section end may be mounted with the possibility of sliding.

According to another embodiment of a cable raceway support device according to the invention, the support face which is an opposite face to the fastening plane has a first planar zone provided with at least one pair, and preferably two pairs, of jaws adapted to receive a first section of cable raceway and a second planar zone provided with at least one pair, and preferably two pairs, of jaws adapted to receive a second section of cable raceway. Here, two cable raceway section ends may be mounted with the possibility of sliding.

To be able to adapt the cable raceway to any kind of support and in various positions, the cable raceway support device according to the present invention advantageously also comprises a spacer having a planar face cooperating with the fastening plane of the support device. The form of the spacer is determined so as to adapt to the constraints of the surroundings imposed by the architecture of the aircraft.

The present invention furthermore concerns a cable raceway for an aircraft, characterized in that it comprises at least one support device as described above as well as an aircraft also, characterized in that it comprises at least one such cable raceway support device.

BRIEF DESCRIPTION OF THE DRAWINGS

Other details and advantages of the present invention will emerge more clearly from the following description, which is made with reference to the accompanying drawings in which:

FIG. 1 very diagrammatically presents the positioning of support devices according to the invention on an aircraft frame, FIG. 2 is a diagrammatic cross-section view on B-B of FIG. 3, FIG. 3 is a diagrammatic cross-section view on A-A of FIG. 2, FIG. 4 is a view at smaller scale corresponding to the view of FIG. 3 for a variant embodiment of a support device according to the invention, and FIGS. 5 and 6 illustrate examples of cable raceway cross-sections which may be used with the support devices of FIGS. 2 to 4.

DETAILED DESCRIPTION

An aircraft conventionally comprises a primary structure having a set of frames, sometimes also called formers, which are distributed over the entire length of the aircraft. The frames are disposed in a transverse plane of the aircraft and are most commonly a toroidal part of profiled cross-section.

Purely by way of illustration, FIG. 1 represents part of an aircraft frame 2 and shows the positioning of cable raceways 4 relative to that frame 2. Two different types of cable raceways 4 are represented in that Figure. Two cable raceways can be distinguished here having U-shaped profiles and one cable raceway having an H-shaped profile. Of course, other forms of cable raceway could be used here. By way of non-limiting examples, cable raceways with the profiles shown in FIGS. 5 and 6 could for example also be used. The cable raceways must adapt to the different constraints of the surroundings and, depending on the available space, have a particular orientation relative to the frame 2. FIG. 1 is intended to illustrate that the cable raceways may have diverse shapes and various orientations relative to the frames 2 of the aircraft. The positions and shapes of the cable raceways represented in that Figure are purely illustrative and in no way limiting.

As is also illustrated diagrammatically in FIG. 1, in the present invention, the cable raceways 4 are not mounted directly on the frames 2 but via a support device 6 which forms an interface between the cable raceway and the corresponding frame.

In a conventional manner, in an aircraft, a cable raceway comprises a structure within which come to be housed the supported cables and further comprises a cover closing and retaining all the cables housed in the structure. The structure is for example a structure of profiled cross-section comprising a planar base on one side of which extend longitudinal walls perpendicular to the base and parallel to each other. Together with the base, two neighboring longitudinal walls thus form a channel adapted to serve as a housing for cables.

Each channel may be equipped with a cover or else the same cover may cover several channels. Each cover is for example held by a self-tightening ratchet system. Such a system comprises a ratchet, formed for example of synthetic material, which extends from the base of the structure towards the open side of the channel. The cover then comprises an opening dimensioned such that the rack of synthetic material may pass through the opening in one direction but not in the other. Of course, the ratchet is oriented such that the cover can be moved towards the back of the channel, that is to say towards the base of the structure.

The present invention may be used with a cable raceway as described earlier but it is also adapted to a cable raceway as described in patent applications FR-2 905 037 and FR-2 905 038. A cable raceway as described in those applications was not yet disclosed at the time of filing the present patent application. This new cable raceway provides various functions also provided by the cable raceways of the prior art. First of all it supports and mechanically protects cables and/or cable harnesses. Thanks to the presence of several channels, it also provides physical segregation of various cables. In those not yet published applications, the cable raceway also provides, in a manner that is original relative to the known cable raceways, the return of the current transported in the supported cables. To that end, this cable raceway comprises a metallic structure of profiled cross-section having at least one housing configured to receive cables or similar and also having a face configured to bear on a carrying wall. This face configured to bear may be covered by a layer of insulating material.

The present invention more particularly concerns devices enabling a cable raceway to be fastened onto the primary structure of the aircraft considered. FIGS. 2 and 3 show a first embodiment of a cable raceway support device 6.

Part of a frame 2 seen from the front can be identified in FIG. 2. The frame 2 appears in cross-section in FIG. 3. As can be seen, it has a z-shaped cross-section. Of course, and as will be apparent to the person skilled in the art from the following part of the present description, it is possible to adapt the present invention to frames of other types.

The support device 6 of FIGS. 2 and 3 comprises a pedestal 8 of parallelepiped general shape. The latter is formed from an electrically conductive material. It has a first planar face referred to subsequently as fastening face 10. The opposite face to that fastening face 10 will be referred to subsequently as support face 12.

The support face 12 is configured to receive two ends, each end corresponding to a distinct section of cable raceway 4. In the example of FIGS. 2 and 3, the cable raceway fastened using the support device 6 has a double-H cross-section with four channels 14. The cable raceway 4 has an installation plane 16 provided to enable it to be fastened. In the case represented, it is a lateral face of an H. The installation plane 16 corresponds here to the outer surface of two channels 14.

The support face 12, over approximately half its area, is entirely planar. This first planar part 18 has two bores 20 passing through the pedestal 8.

The second planar zone or part 19, e.g., the other half of the support face 12, is substantially planar but has two first contacts 22 projecting above the support face and also has two jaws 24, thereby forming two pairs of jaws, overhanging the support face 12. In each pair, each jaw 24 (FIG. 2) forms, together with part of the pedestal 8, a stirrup-shaped clamp comprising a base 26 and two branches. One branch of the clamp merges with the pedestal 8 itself. The other branch of each clamp corresponds to the jaw 24 and bears a second contact 30 which each time faces a first contact 22. Each of the second contact 30 also projects relative to the jaw 24.

In the present example embodiment, the first contacts 22 and the second contacts 30 comprise a pair of projecting members which have a pointed tooth-shape so as to generate a higher pressure in the contact zone which promotes the electrical contact. Furthermore, the first contacts 22 and second contacts 30 facing each other are here of identical shape.

Each of the contacts, whether they be the first contacts 22 or the second contacts 30, is covered with nickel or with an alloy having a high proportion of that metal. In this way, at the location of each clamp a pair of sliding contacts is formed.

As can be seen on the left part of FIG. 3, one end of the installation plane 16 of the section of cable raceway 4 comes to lie on the entirely planar part of the support face 12. It is fastened onto the support device 6 using screws 32 passing through bores formed in the cable raceway 4 and in the bores 20.

The support device 6 also receives one end of a second section of cable raceway 4. The installation plane 16 of this second cable raceway also comes to lie on the support face 12 but by coming to lie on the first contacts 22. The distance between the first contacts 22 and the second contacts 30 is such that the wall of the cable raceway 4 corresponding to the installation plane 16 is pinched between those contacts. The U-shaped clamp, formed by a pair of jaws, is elastically deformable and the wall of the cable raceway is taken between the jaws of that clamp with clamping that ensures good electrical contact. The clamping is however not excessive, so as to enable movement of the section of cable raceway 4, in particular in case of expansion. Clearance e is provided between the ends of the two sections of cable raceway 4 mounted on the support device 6 to enable free expansion of a section. Furthermore, the cable raceway section 4 fastened by the screw 32 also defines clearance with the jaw 24.

As can be noted in FIGS. 2 and 3, the support device 6 also comprises a spacer 34 which enables it to adapt to the constraints of the surroundings. To be precise, that spacer 34 has a planar face cooperating with the fastening face 10 of the pedestal 8 and an opposite face cooperating with the frame 2.

The spacer 34 is a part which may take multifarious forms to make the link between the pedestal 8 and the primary structure of the aircraft. It makes it possible to adapt a standardized part such as the pedestal 8 to the structure of the aircraft in order to be able to mount that pedestal 8 in practically all the possible positions at practically any point of a frame 2.

This spacer 34 may be insulating—with regard to heat and/or electricity—or else on the contrary be electro-thermo conducting. This may depend for example on the nature of the cables supported by the cable raceway or on the overall electrical architecture of the aircraft.

As suggested in FIGS. 2 and 3, it may be provided for each cable raceway section to fixedly mount a first end of the section and to mount its other end with a possibility of sliding. Thus the cable raceways may expand and deform independently of the deformation and expansion of the primary structure of the aircraft.

In certain configurations, it may however be preferable to have a possibility of sliding at both ends of a section of cable raceway. In this case, a support device as shown in FIG. 4 is advantageous. The view in this Figure corresponds, at slightly smaller scale, to a variant embodiment of the device shown in FIGS. 2 and 3, without the cable raceway, as represented in FIG. 3. It may be noted that FIG. 2 also corresponds to a cross-section view of the variant embodiment of FIG. 4, which is transverse (relative to the cable raceway).

The pedestal 8 of FIG. 4 enables two ends of cable raceway sections to be received with a possibility of sliding, by virtue of a double device. On the support face 12 of this pedestal 8 there are to be found not two (as in FIGS. 2 and 3) but four pairs of sliding contacts. Four pairs of jaws 24 are also to be found—one jaw 24 of each pair merging with the pedestal 8—forming housings for two cable raceway ends.

Whereas in the embodiment of FIGS. 2 and 3, the fastening of an end of a section of cable raceway to the pedestal 8, as well as the fastening of the pedestal 8 with its spacer 34 onto a frame 2, were performed in the same operation and with the same screws 32, here separate screws 32' are used to fasten the pedestal 32' onto a frame 8. In the embodiment represented in FIG. 4, it is provided to have a tapped bore in the fastening face 10 of the pedestal 8 to receive each screw 32'

In the example embodiment of FIG. 4, which comprises four pairs of jaws, both jaws 24 of two pairs of a first part of the device and both jaws 24 of two pairs of a second part of the device have between them a space e' which is advantageously situated directly opposite the screw 32'.

The support devices described above may be used on any type of aircraft but are more particularly designed for aircraft produced entirely, or partly, from composite materials. They make it possible to perform the assembly of sections of cable raceway and their fastening onto the primary structure of the aircraft.

As stated above in the description, the support devices described above are also adapted for cable raceways that provide the return for the current passing in the supported cables. The support devices described here enable electrical continuity to be provided between the sections of cable raceway assembled and mounted on the aircraft structure. They also make it possible to minimize the contact resistances between the cable raceway and the structure of the aircraft.

The support devices described also enable the cable raceway to work and to expand without exerting stresses on the structure of the aircraft.

The present invention is not limited to the preferred embodiments described above by way of non-limiting examples nor to the variants referred to. It also concerns the other variants within the capability of the person skilled in the art in the context of the claims given below.

The invention claimed is:

1. A cable raceway support device for an aircraft, formed from an electrically conductive material, the cable raceway support device comprising:
   a pedestal comprising:
      a fastening plane for fastening the device onto a primary structure, and
      a support face opposite to the fastening plane, the support face comprising:
         at least one pair of jaws, each jaw of the at least one pair of jaws overhanging the support face and forming, with part of the pedestal, a stirrup-shaped clamp, wherein each clamp comprises a base and two branches, the first branch merging with the pedestal, the second branch corresponding to the jaw, and the base separating the first branch from the second branch,
         a first planar zone adapted to receive a first section of cable raceway and comprising at least two bores of the pedestal, and a second planar zone adapted to receive a second section of cable raceway and comprising the at least one pair of jaws, and at least two contacts, the first contact projecting from the first branch and the second contact projecting from the second branch to face the first contact;
wherein the two contacts provide a sliding electrical contact to be formed.

2. The cable raceway support device according to claim 1, wherein the jaws of the pair of jaws are elastically linked together so as to form the clamp.

3. The cable raceway support device according to claim 1, wherein the contacts are formed from a conductive material chosen from a group comprising nickel, silver, and alloys comprising a proportion of those metals.

4. The cable raceway support device according to claim 1, wherein the first planar zone is provided with at least one pair of jaws adapted to receive the first section of the cable raceway and the second planar zone is provided with at least one pair of jaws adapted to receive the second section of the cable raceway.

5. The cable raceway support device according to claim 1, further comprising a spacer having a planar face cooperating with the fastening plane of the support device.

6. An aircraft cable raceway, comprising at least one cable raceway support device according to claim 1.

7. An aircraft comprising at least one cable raceway support device according to claim 1.

* * * * *

UNITED STATES PATENT AND TRADEMARK OFFICE
CERTIFICATE OF CORRECTION

| | | |
|---|---|---|
| PATENT NO. | : 9,172,230 B2 | Page 1 of 1 |
| APPLICATION NO. | : 13/624176 | |
| DATED | : October 27, 2015 | |
| INVENTOR(S) | : Pierre Charon | |

It is certified that error appears in the above-identified patent and that said Letters Patent is hereby corrected as shown below:

On title page, item 30- Please insert:

--(30)    Foreign Application Priority Data

Sept. 21, 2011    (FR)    1158383--

Signed and Sealed this
Twenty-third Day of February, 2016

Michelle K. Lee
*Director of the United States Patent and Trademark Office*